US008938505B2

(12) United States Patent
Nivala et al.

(10) Patent No.: US 8,938,505 B2
(45) Date of Patent: Jan. 20, 2015

(54) CO-AUTHORING FOR A DOCUMENT MANAGEMENT SYSTEM

(75) Inventors: Antti Nivala, Pirkkala (FI); Jari Paija, Urjala (FI); Ari Metsäpelto, Sastamala (FI)

(73) Assignee: M-Files Oy, Tampere (FI)

( * ) Notice: Subject to any disclaimer, the term of this patent is extended or adjusted under 35 U.S.C. 154(b) by 202 days.

(21) Appl. No.: 13/534,766

(22) Filed: Jun. 27, 2012

(65) Prior Publication Data

US 2014/0006516 A1 Jan. 2, 2014

(51) Int. Cl.
*G06F 15/16* (2006.01)
*G06F 3/00* (2006.01)
*H04L 29/08* (2006.01)
*G06Q 10/10* (2012.01)

(52) U.S. Cl.
CPC .......... *G06Q 10/101* (2013.01); *H04L 67/1095* (2013.01)
USPC .......................................... 709/205; 715/751

(58) Field of Classification Search
CPC ... G06Q 10/10; G06Q 10/103; H04L 67/1095

USPC .......................................... 709/205; 715/751
See application file for complete search history.

(56) References Cited

U.S. PATENT DOCUMENTS

| 6,067,551 | A | * | 5/2000 | Brown et al. ......................... 1/1 |
| 2013/0014023 | A1 | * | 1/2013 | Lee et al. ....................... 715/751 |
| 2013/0019028 | A1 | * | 1/2013 | Myers et al. ................... 709/246 |
| 2013/0246901 | A1 | * | 9/2013 | Massand ....................... 715/229 |

* cited by examiner

*Primary Examiner* — Jeong S Park
(74) *Attorney, Agent, or Firm* — Ware, Fressola, Maguire & Barber LLP

(57) ABSTRACT

The invention relates to a document management system and a method therein. In order to perform co-authoring of an electronic object between at least two devices, the method comprises performing a reservation of an electronic object from a server for co-authoring from a first client device, writing the electronic object in modifiable form to a co-authoring folder in a common location accessible by the first client device and at least one other device; providing an access to at least one other device to the co-authoring folder; and when co-authoring of the electronic object is finished, reading the electronic object from the co-authoring folder and writing the electronic object to the server.

9 Claims, 8 Drawing Sheets

CO-AUTHORING FOR A DOCUMENT MANAGEMENT SYSTEM

FIELD OF THE INVENTION

The present invention relates to co-authoring for a document management system.

BACKGROUND OF THE INVENTION

Enterprise Content Management (ECM) system refers to a system organizing and storing organization's electronic documents and other business-related objects and/or content. ECM system may comprise content management systems (CMS), document management systems (DMS) and data management systems. Such systems comprise various features for managing electronic documents, e.g. storing, versioning, indexing, searching for and retrieval of documents. It is appreciated that there are both dynamic and static content management systems. The difference between dynamic and static systems is the way they store files. In the static systems files are stored e.g. in a constant treelike hierarchy that defines relationships for folders and documents stored in the tree. In the dynamic systems the files may be given identifications that define their existence in the system. The location of the files is not constant, but may vary in a virtual space depending on the situation.

SUMMARY OF THE INVENTION

Now there has been invented an improved method and technical equipment implementing the method, by which the operation of the enterprise content management system can be expanded. The present embodiment enables co-authoring of a document between users and non-users of a document management system. In addition, the present embodiments enable co-authoring between users of an on-premise document management system and external users. Various aspects of the invention include a method, a server, a client device, a computer program product comprising a computer program stored therein, and a document management system, which are characterized by what is stated in the independent claims. Various embodiments of the invention are disclosed in the dependent claims.

According to a first aspect, the method in a document management system for co-authoring an electronic object between at least two devices comprises performing a reservation of an electronic object from a server for co-authoring from a first client device; writing the electronic object in modifiable form to a co-authoring folder in a common location accessible by the first client device and at least one other device; providing an access to at least one other device to said co-authoring folder; and when co-authoring of the electronic object is finished, reading the electronic object from the co-authoring folder and writing the electronic object to the server.

According to a second aspect, the server for a document management system for co-authoring an electronic object between at least two devices comprises a processor, memory including computer program code, the memory and the computer program code configured to, with the processor, cause the server to perform at least the following: receiving a reservation of an electronic object for co-authoring from a first client device; writing the electronic object in modifiable form to a co-authoring folder in a common location accessible by the first client device and at least one other device; providing an access to at least one other device to said co-authoring folder; and when co-authoring of the electronic object is finished, reading the electronic object from the co-authoring folder and writing the electronic object to the server.

According to a third aspect, a client device for a document management system for co-authoring an electronic object with at least one other device comprises a processor, memory including computer program code, the memory and the computer program code configured to, with the processor, cause the client device to perform at least the following: performing a reservation of an electronic object from a server for co-authoring; writing the electronic object in modifiable form to a co-authoring folder in a common location accessible by said client device and said at least one other device; providing an access to at least one other device to said co-authoring folder; and when co-authoring of the electronic object is finished; reading the electronic object from the co-authoring folder and writing the electronic object to the server.

According to a fourth aspect, the computer program product for co-authoring an electronic object comprises a computer-readable medium bearing computer program code embodied therein for use with a computer, the computer program code comprising: code for performing a reservation of an electronic object from a server for co-authoring from a first client device; code for writing the electronic object in modifiable form to a co-authoring folder in a common location accessible by the first client device and at least one other device; code for providing an access to at least one other device to said co-authoring folder; and code for reading the electronic object from the co-authoring folder and writing the electronic object to the server when co-authoring of the electronic object is finished.

According to a fifth aspect, the document management system comprises at least one server and at least a first client device, said at least one server being configured to store a document, and said system being configured to allow co-authoring of an electronic object between at least two devices, wherein the server is configured to receive a reservation of an electronic object for co-authoring from a first client device; the system is configured to write the electronic object in modifiable form to a co-authoring folder in a common location accessible by the first client device and at least one other device; the system is configured to provide an access to at least one other device to said co-authoring folder; and when co-authoring of the electronic object is finished, to read the electronic object from the co-authoring folder and to write the electronic object to the server.

According to an embodiment, the co-authoring folder is located in a cloud service.

According to an embodiment, the at least one other device is a device not having a client access to the document management system.

According to an embodiment, the at least one other device is a second client device of the document management system.

According to an embodiment, the co-authoring folder is located in the document management system.

According to an embodiment, the electronic object is removed from the co-authoring folder when the co-authoring is finished.

According to an embodiment, the electronic object being written to the co-authoring folder comprises at least one of the following: a file, part of the metadata of the electronic object, all metadata of the electronic object.

According to an embodiment, a link is sent to said at least one other device. said link being configured to provide the access to the electronic object in said co-authoring folder.

According to an embodiment the server is an on-premise server.

DESCRIPTION OF THE DRAWINGS

In the following, various embodiments of the invention will be described in more detail with reference to the appended drawings, in which.

DETAILED DESCRIPTION OF THE EMBODIMENTS

Figure 1:
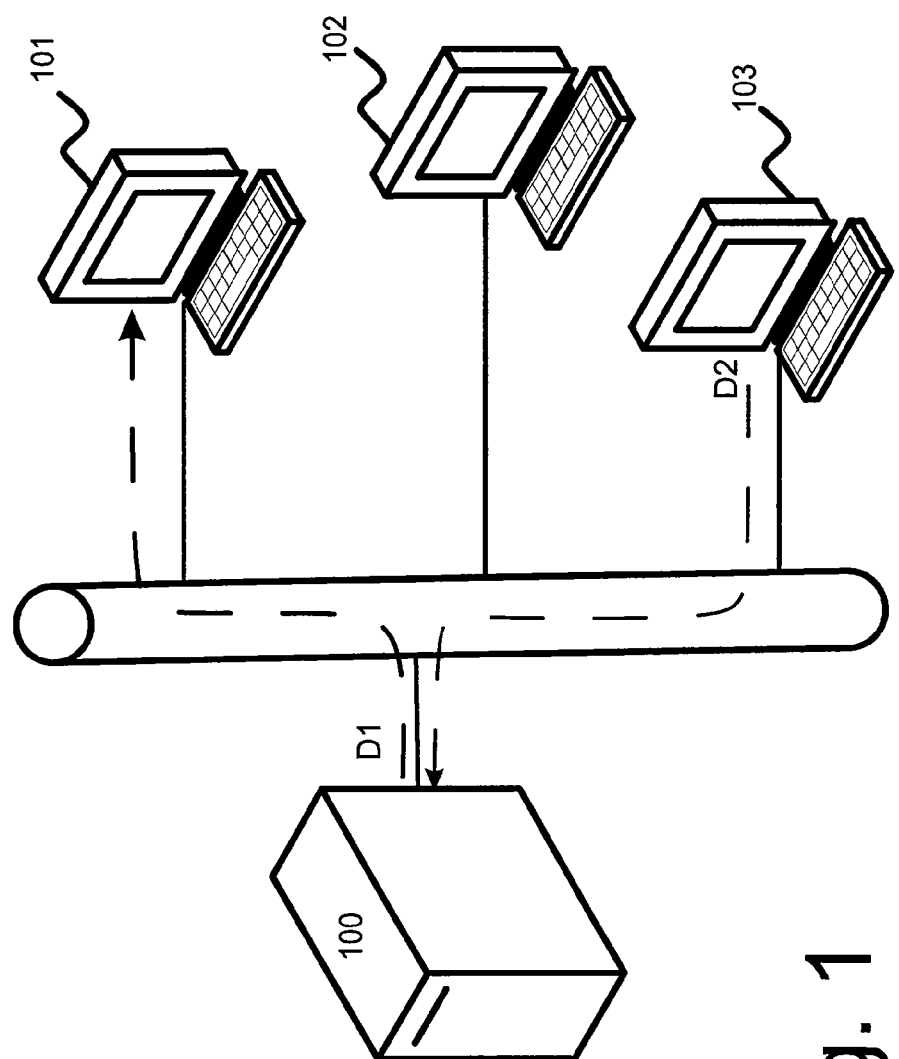
FIG. 1 shows a simplified example of a document management system.

In the following, several embodiments of the invention will be described in the context of enterprise content management system. It is to be noted, however, that the invention is not limited to enterprise content management systems. In fact, the different embodiments have applications widely in any environment where documents can be reserved for modification.

In this context, the term document management system (DMS) refers to a file arrangement that stores objects that are defined by metadata (i.e. properties). Other terms that are typically used for document management system are content management system (CMS) and data management system. In the present disclosure the term "document management system" is a general term referring also to content and data management systems. In addition, term enterprise content management (ECM) can be used as an umbrella term covering one or more of such systems. Document management system comprises various features for managing electronic documents, e.g. storing, versioning, indexing, searching for and retrieval of documents. It is appreciated that there are both dynamic and static document management systems. The difference between dynamic and static systems is the way they store files. In the static systems files are stored e.g. in a constant treelike hierarchy that defines relationships for folders and documents stored in the tree. In the dynamic systems the files may be given identifications that define their existence in the system. The observed location of the files is not constant, but may vary in a virtual space depending on the situation.

In the present embodiments, the document management system is an on-premise type of a system. "On-premise" means that the document management server(s) are located behind the organization's network firewall, where they are generally not accessible by the public. Instead, such "on-premise" server(s) are generally accessible only by users within the firewall-protected local area network, or by connecting to the organization's virtual private network with appropriate tools, requiring organization-specific authentication. The "on-premise" server(s) are typically physically located in buildings owned or leased by the organization, or in a private data center controlled and maintained by a contractor of the organization. As opposed to an "on-premise" document management system, a "cloud-based" document management system has its server(s) located outside the organization's firewall.

Before describing the invention in a more detailed manner, a few terms are defined in order to ease the reading and understanding of the invention. In this disclosure, the term "document" relates to a medium (a file) that has been created by a certain application and that has been associated with metadata. For example, a piece of text created by using the Microsoft Word application is a file. For the purposes of the present solution the document (i.e. electronic document) should also support co-authoring (e.g. a file created by Microsoft Office Word 2010). Instead of term "document" also term "electronic object" may be used. "Metadata" refers to information on a document's properties. For example, a creator of the file or a creation date may represent the metadata. Documents and other metadata defined electronic objects are located statically or virtually in the file arrangement. Virtual location is defined by giving a document location(s) based on its metadata, which then addresses the document into a certain virtual folder depending on the route the document is approached. Therefore the content of each folder depends on the current property values of objects and may vary according to a use case and is thus dynamic.

An example of a file arrangement is illustrated in FIG. 1. This file arrangement is an on-premises document management system that comprises a document management server 100 and client devices 101, 102, 103, which are all interconnected. The interconnection can be wired or wireless and it may be substantially always on or it may be disconnected occasionally. The server 100 is configured to store objects (e.g. documents) that can be retrieved by the client devices 101, 102, 103. The server and client devices each typically includes at least one processor and at least one memory (computer readable medium) for storage of at least computer program code for execution by the at least one processor. The client device can be any electronic device capable of computing, such as e.g. a personal computer, a laptop, a mobile device.

As an example, in FIG. 1 document D1 is retrieved by client device 101, whereas document D2 is stored by the client device 103 to the document management server 100. The document management server 100 is configured mainly to store documents, but in use the document management server may have other functions as well, e.g. it controls access rights, registers modifications made to documents and allows connections to other systems. In FIG. 1, there are one server. However, in some cases, the computer system may comprise more than one server where the document management system is divided. A document stored in the document management system is an example of an electronic object. Such an object is given metadata items (i.e. property values) e.g. a name of creator, a type of a document, a project which the document belongs to, a security class, a client etc.

As was mentioned, the document management system can be dynamic so that the folders are virtual, and the documents are virtually located in the folders depending on the user's viewpoint that builds on top of metadata. The present solution can however be utilized in a file management system statically storing folders that comprises files. Documents can have more than one location in the dynamic document management system but the document as such is the same document throughout the locations. In other words, the document is stored into the document management system only once, but is given multiple locations based on its metadata items. Therefore, term "location" should be interpreted both physical and virtual location depending on the file arrangement to cover both dynamic document management system and file management system.

The typical functions of a document management system are the check-out and the check-in operations for the document. When a user wishes to modify document's content, s/he may check out the document, whereby the document becomes reserved for that user. No other users are allowed to check-out the document simultaneously. Other users may, however, open the document in read-only mode. When the user having checked-out the document finishes with the document, the user makes the document available to other users by checking the document in again. At least at that point the modifications can be saved to the document. Now, another user may check the document out to make his/her modifications to the document. The check-out function thus reserves the document for a certain user, and makes it possible to allow the user to make changes to the document in exclusive editing mode.

Figure 2:
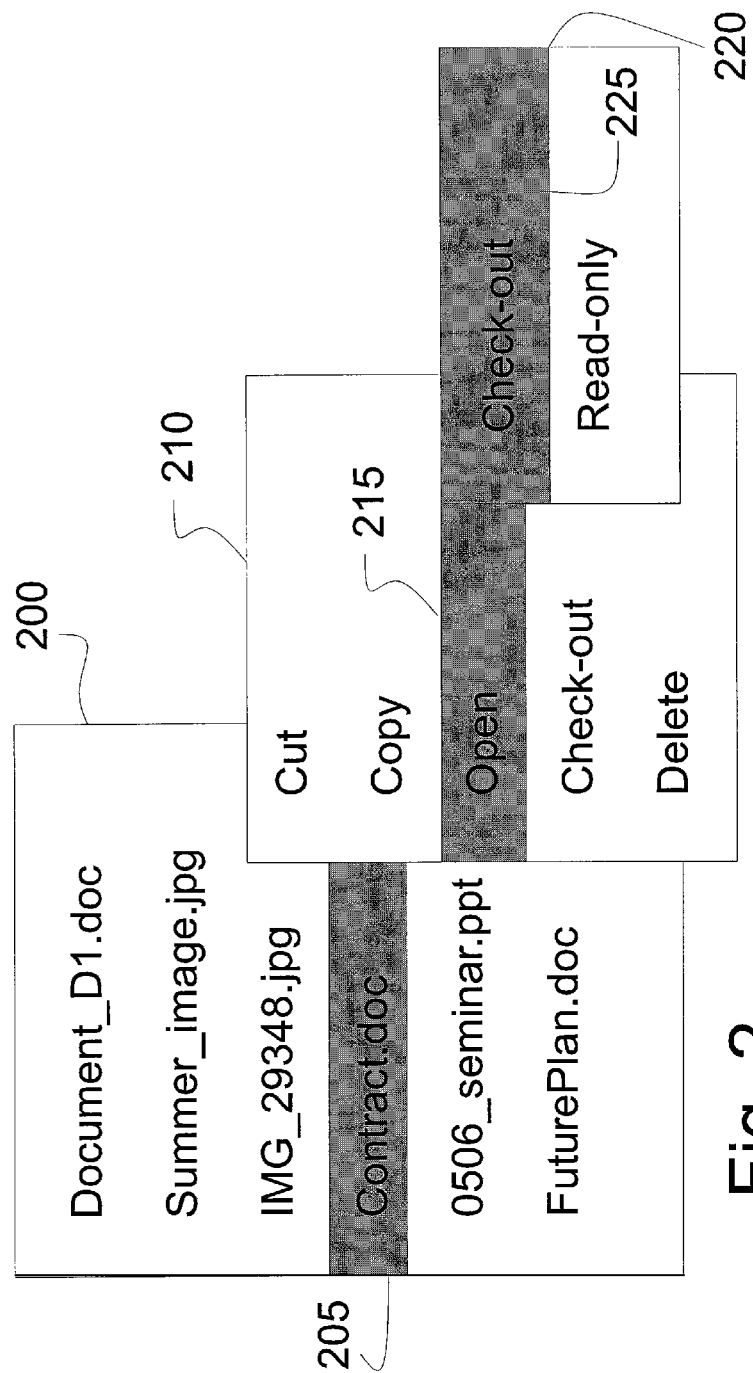
FIG. 2 shows a simplified example of a user interface view for performing a check-out for a document.

FIG. 2 illustrates a simplified example of a user interface view for checking out a document. At first, the user A is provided with a view to a menu 200, comprising a list of electronic objects. The menu 200 comprises "Document_D1.doc", "Summer_image.jpg", "IMG_29348.jpg", "Contract.doc", "0506_seminar.ppt", "FutureP-lan.doc, which are file names for the objects. The objects may have metadata for defining properties (not shown in FIG. 2) for each object. The user A may scroll through the objects, and select one for modification. In FIG. 2, the user A selects "Contract.doc" 205, whereby the user A is shown a view to an action menu 210. The action menu 210 comprises options for possible actions the user A is able to do with the document. It is appreciated that the content of the action menu can deviate greatly from what has been presented by FIG. 2. In this example, possible actions for the documents 205 are "cut", "copy", "open", "check-out", "delete". The "check-out" action may be a direct path for opening and checking-out the document, or the "check-out" may only check the document out without opening it to the application. However, in this example, the user A wishes to "open" 215 the document, whereby the user A is shown yet another view 220 listing two different modes for opening the document: "check-out" and "read-only". The user A wishes to modify the document, whereby s/he selects "check-out" mode 225 for the document. By this selection, the document becomes reserved for the user A.

Figure 3:
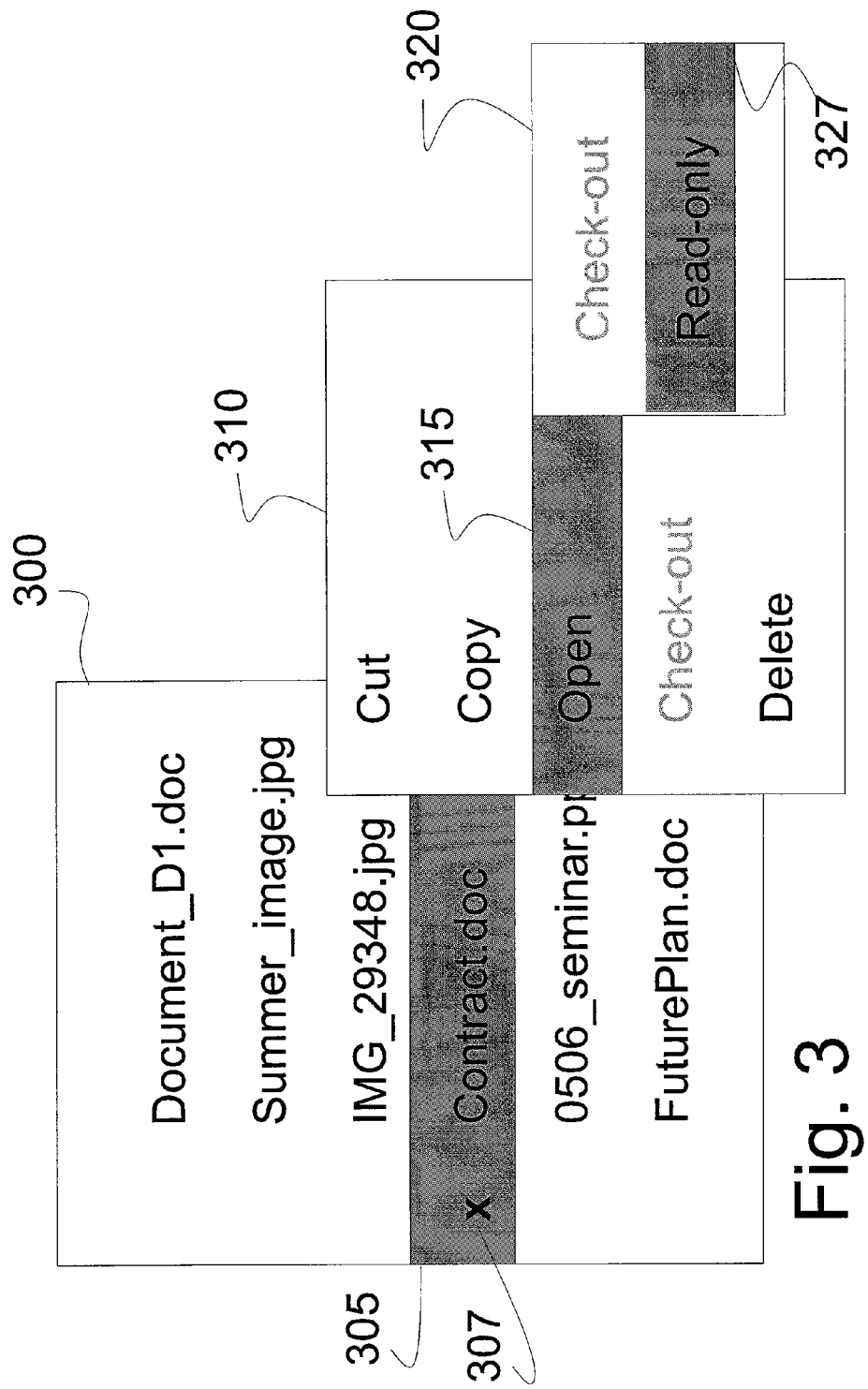
FIG. 3 shows a simplified example of a user interface view for opening a checked-out document.

FIG. 3 illustrates a simplified example of a user interface view for another user B, who is also shown a view to a menu 300 (comprising the electronic objects as in FIG. 2). User A has checked-out the object "Contract.doc" 305, and that is indicated to user B with a mark 307 along with the file name "Contract.doc". The mark 307 can be any visual indication for telling users that an object is already opened for modifications by another user. The user B can still select the "Contract.doc" 305, whereby an action menu 310 is shown to the user B. The action menu 310 comprises same actions as in FIG. 2, with an exception that action "check-out" is not selectable. When the user selects "open" 315, the user is displayed another view 320 having options for the opening. Now that the user A has already checked-out the document, the user B may open the document as "read-only" 327.

Figure 4:
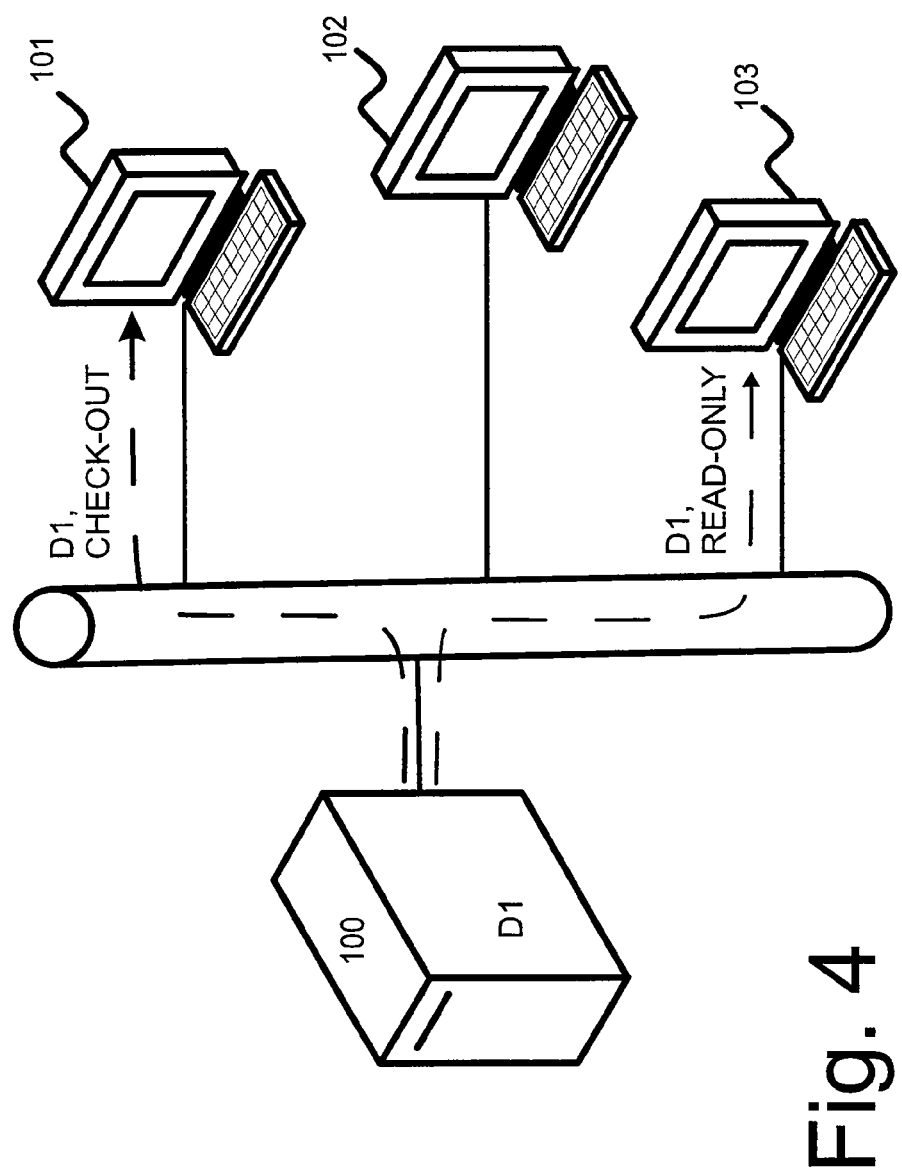
FIG. 4 shows a simplified example of a document management system where a document has been checked out.

The basic procedure of check-out mode is also illustrated in FIG. 4, comprising the document management server 100 storing document D1. A client device 101 opens the document D1 in a check-out mode, whereby modifications to the document D1 can be performed via the client device 101. The client device 103 may now open the same document D1 in a read-only mode, whereby modifications by client device 103 are prevented.

It is realized that this kind of a solution excludes the possibility to perform co-authoring of a document between several users. Co-authoring (i.e. coauthoring, shared modification, simultaneous editing) means that more than one user may work with a document simultaneously and to see the changes other users are doing in real-time or near real-time, e.g., each time the user chooses the Save command to save interim changes.

The nature of the document management system is such, that the document management server 100 stores the document data, and each client device 101, 102, 103 has its own working copy of the document. When, for example, client device 101 checks out a document, the document is reserved for modifications made by client device 101. Client devices 102, 103 cannot check out the same document—they can only open the document in a read-only mode. When the client device 101 checks in the document, the document is saved with the modifications to the server 100, and made available to the other client devices 102, 103.

The present embodiments propose solutions for allowing several client devices to access the same document and to perform co-authoring of the document. The solutions are usable in document management system according to the example of FIG. 1.

In the present embodiments, the document may have, in addition to modes "check-out", "check-in", "read-only", yet a new mode "remote check-out". The remote check-out is configured to locate the document to such a folder (i.e. a common folder) that can be used by more than one user. The locating in practice may be creating a copy of the document to such a place that can be accessed by applications of various users and where the copy of the document can be modified.

Figure 5:
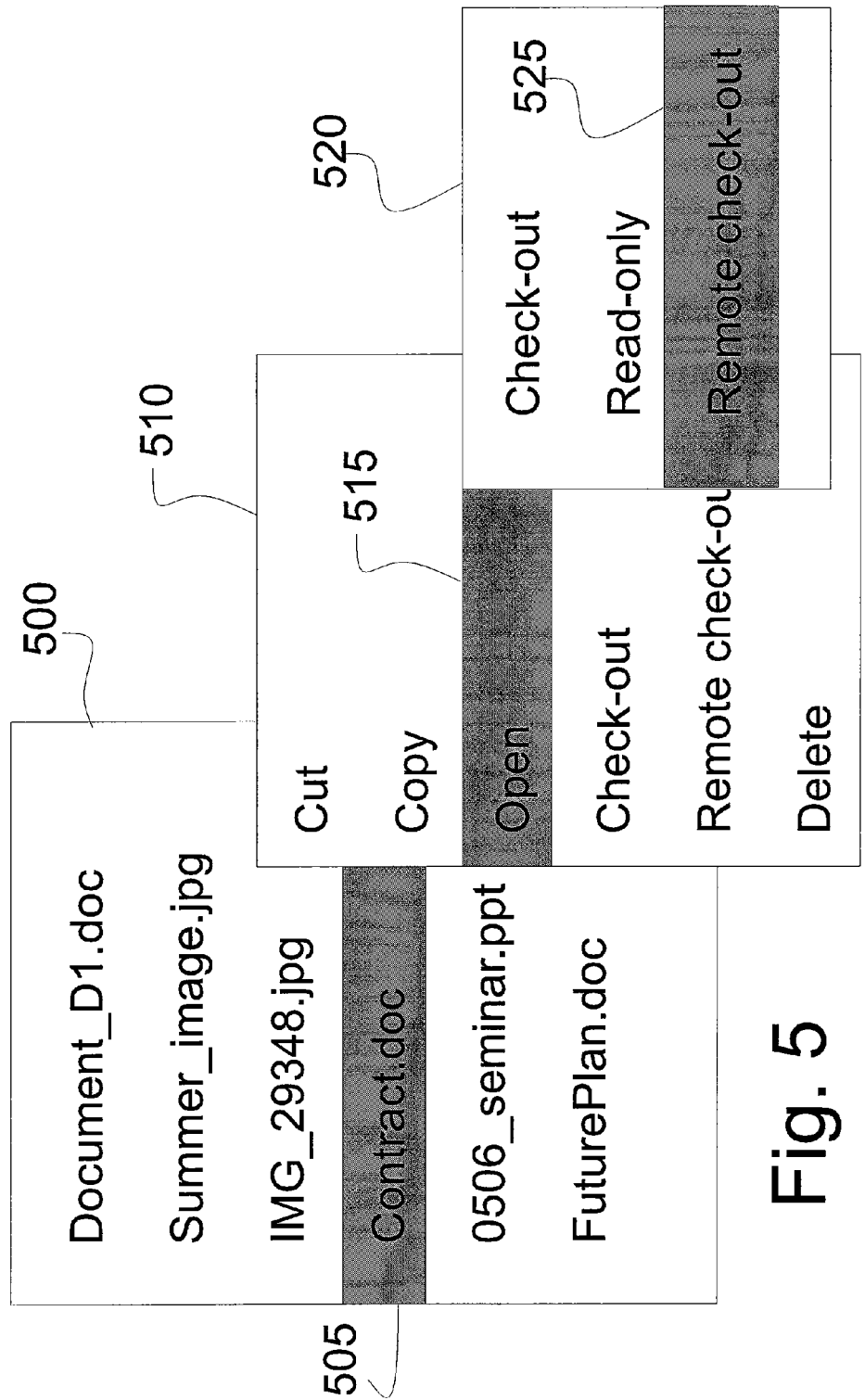
FIG. 5 shows a simplified example of a user interface view for performing a remote check-out for a document.
Figure 6:
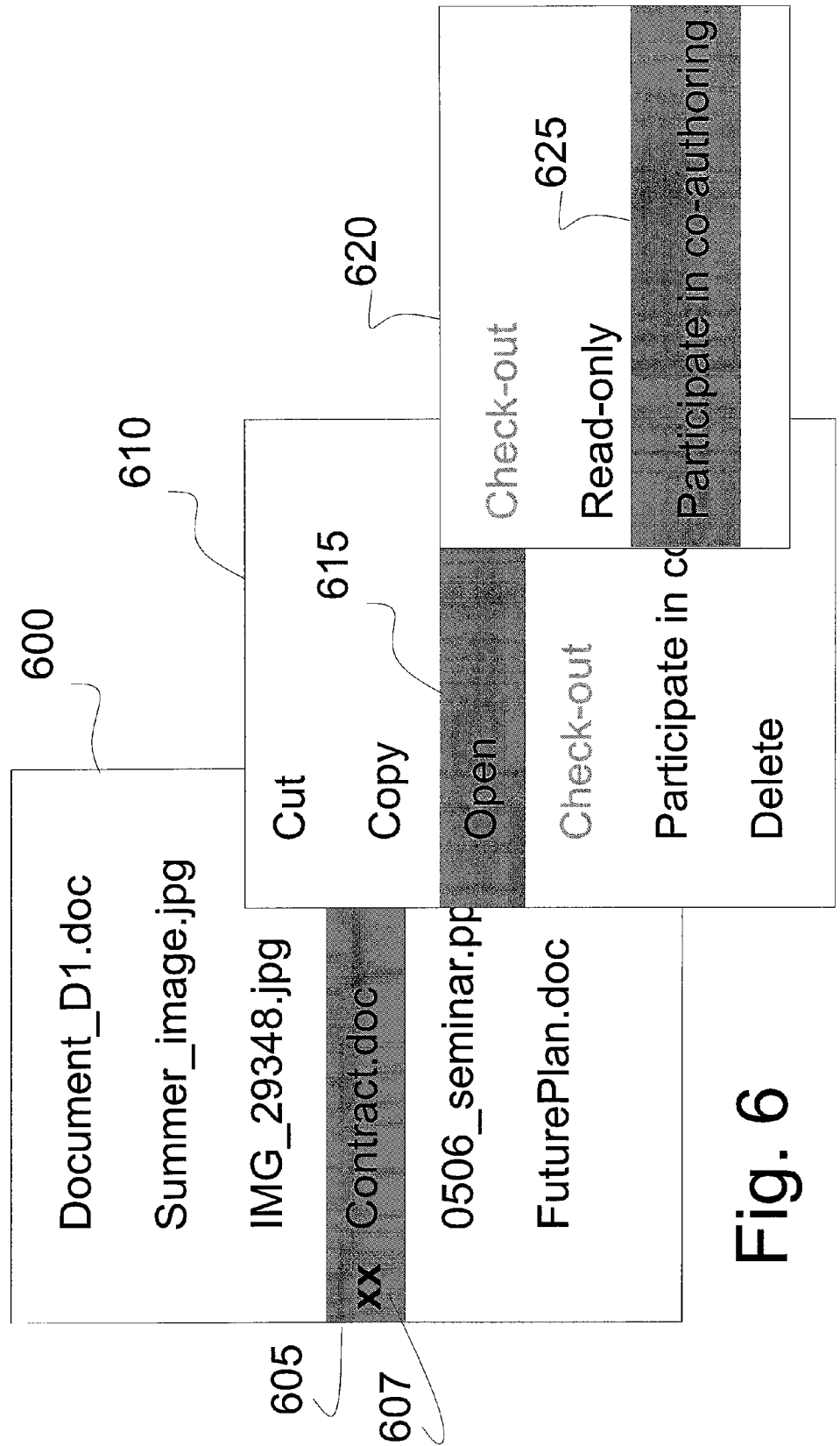
FIG. 6 shows a simplified example of a user interface view for opening a document that has been checked-out remotely.

FIGS. 5 and 6 illustrate example user interface views for corresponding situations shown by FIGS. 2 and 3.

FIG. 5 illustrates a simplified example of a user interface view for checking out a document. At first, the user A is provided with a view to a menu 500, comprising a list of electronic objects. The menu 500 comprises "Document_D1.doc", "Summer_image.jpg", "IMG_29348.jpg", "Contract.doc", "0506_seminar.ppt", "FutureP-lan.doc, which are file names for the objects. The objects may have metadata for defining properties (not shown in FIG. 5) for each object. The user A may scroll through the objects, and select one for modification. In FIG. 5, the user A selects "Contract.doc" 505, whereby the user A is shown a view to an action menu 510. The action menu 510 comprises options for possible actions the user A is able to do with the document. It is appreciated that the content of the action menu can deviate greatly from what has been presented by FIG. 5. In this example, possible actions for the documents 505 are "cut", "copy", "open", "check-out", "remote check-out", "delete". In this example, the user A wishes to "open" 515 the document, whereby the user A is shown yet another view 520 listing three different modes for opening the document: "check-out", "read-only" and "remote check-out". The user A wishes to co-author the document with other users, whereby s/he selects "remote check-out" mode 525 for the document. By this selection, the document becomes reserved for the user A but is available for other users as well in a co-authoring folder. The co-authoring folder is described in more detailed later.

When the user A performs "remote check-out" for a document, the document becomes reserved for user A and made available for other users in a co-authoring folder. This means that the document is written in modifiable form to the co-authoring folder in a common location accessible by the users. The other users are provided with an access to the co-authoring folder. The document that is written to the co-authoring folder is typically a copy of the document file. It is not necessary to copy also all or part of the metadata of the document. However, that is also possible. Therefore, when describing that an electronic object is copied (i.e. written) to a co-authoring folder, the copy of the electronic object may include a file and/or one or more properties (i.e. pieces of metadata). It is thus also possible that in some situations the electronic object that is copied to the co-authoring folder comprises only metadata or part of the metadata without the actual file.

FIG. 6 illustrates an example of a user interface view by means of which the access to the co-authoring folder can be provided to the other users. FIG. 6 illustrates a simplified example of a user interface view for another user B. The user B is also shown a view to a menu 600 (comprising the electronic objects as in FIG. 5). User A has remotely checked-out the object "Contract.doc" 605, and that is indicated to user B with a mark 607 along with the file name "Contract.doc". The mark 607 can be any visual indication for telling users that an object is reserved for coauthoring. The user B can select the "Contract.doc" 605, whereby an action menu 610 is shown to the user B. The action menu 610 comprises same actions as in FIG. 5, with an exception that action "check-out" is not selectable. In addition, the action menu 610 comprises a direct selection "participate in co-authoring". When the user selects "open" 615, the user is displayed another view 620 having options for the opening. Now that the user A has already remotely checked-out the document, the check-out mode is not selectable. The user B may open the document as "read-only" or perform the "participate in co-authoring" action 625 to participate in co-authoring of a document. When the user B selects "participate in co-authoring", the user B is shown the document from the co-authoring folder.

When the users finish co-authoring of the document, the document is read from the co-authoring folder and written to the server. At this point, the document may be removed from the co-authoring folder.

In an embodiment, the co-authoring folder is located on the document management server, as on-premises. Such a folder is accessible by any user who has logged in to the document management system (i.e. any client device for the document management system). In another embodiment, the co-authoring folder is located on another on-premises server. Such a folder is generally accessible by any user working in the organization's local area network or virtual private network and possessing appropriate authentication credentials that the server requires.

Figure 7:
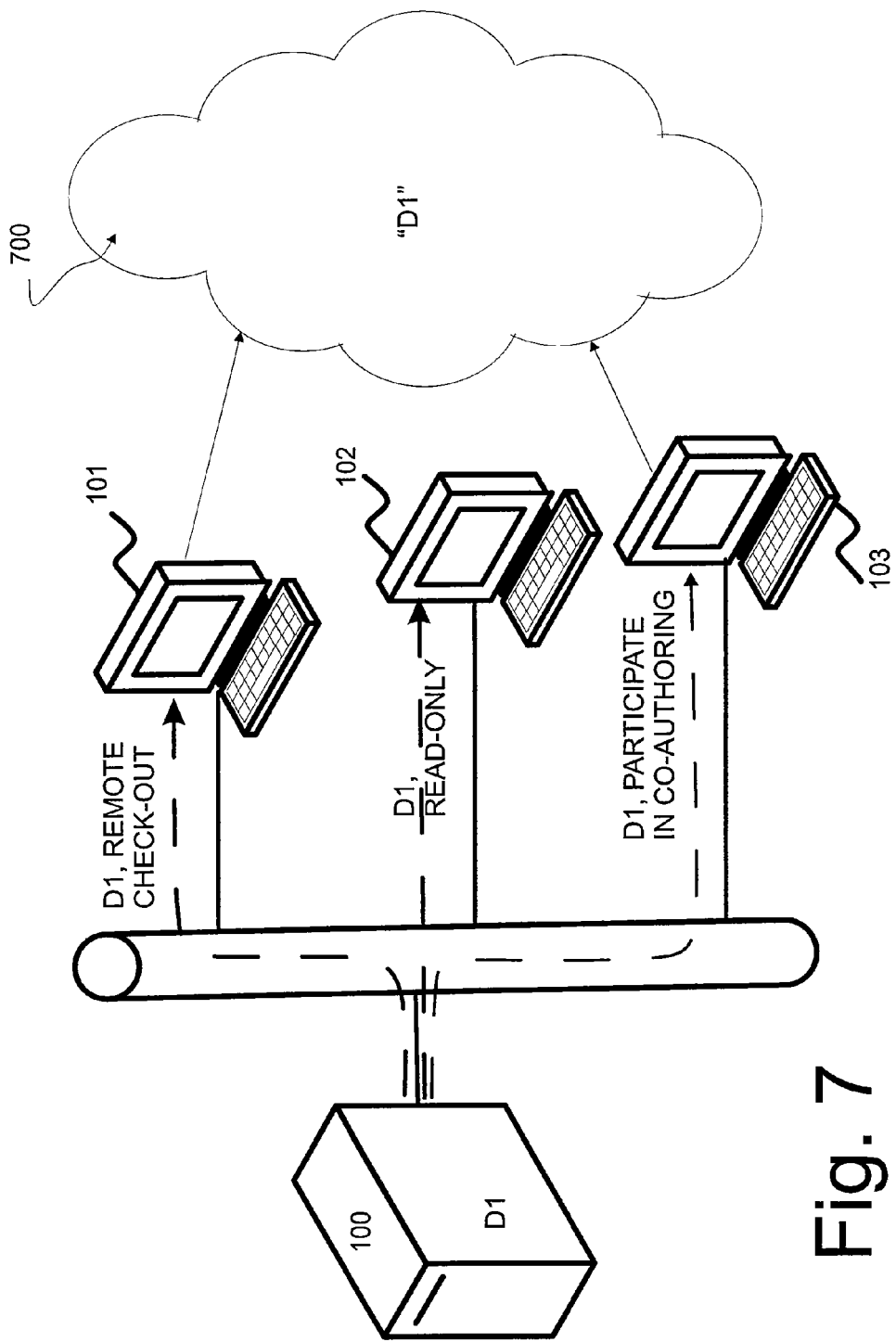
FIG. 7 shows a simplified example of a document management system where a document has been remotely checked out by client devices.

In yet another embodiment, the co-authoring folder is located in a cloud service, as off-premises. The cloud-based co-authoring folder can be in any cloud service that makes it possible to perform co-authoring (e.g. SkyDrive of Microsoft). Such a folder can be accessed by any user, even the ones that cannot access the document management system. Such a solution is a great achievement because it combines a co-authoring space of a public cloud to a document management system that is located within a firewall of an organization. An example of this kind of a co-authoring folder is shown in FIG. 7. In this example, the document management server 100 stores document D1. A client device 101 remotely checks out the document D1 for co-authoring. A co-authoring folder is created to (or already exists in) a cloud service 700, where the working copy "D1" of the document D1 is generated. The client device 101 has an access to the cloud service 700. A client device 103 may participate in co-authoring the same document D1, whereby the client device 103 is directed to the cloud service 700 to work with the document "D1". The client device 102 has selected a read-only mode for the document D1, whereby the client device 102 cannot access the cloud service 700 and modifications by the client device 102 are prevented.

Figure 8:
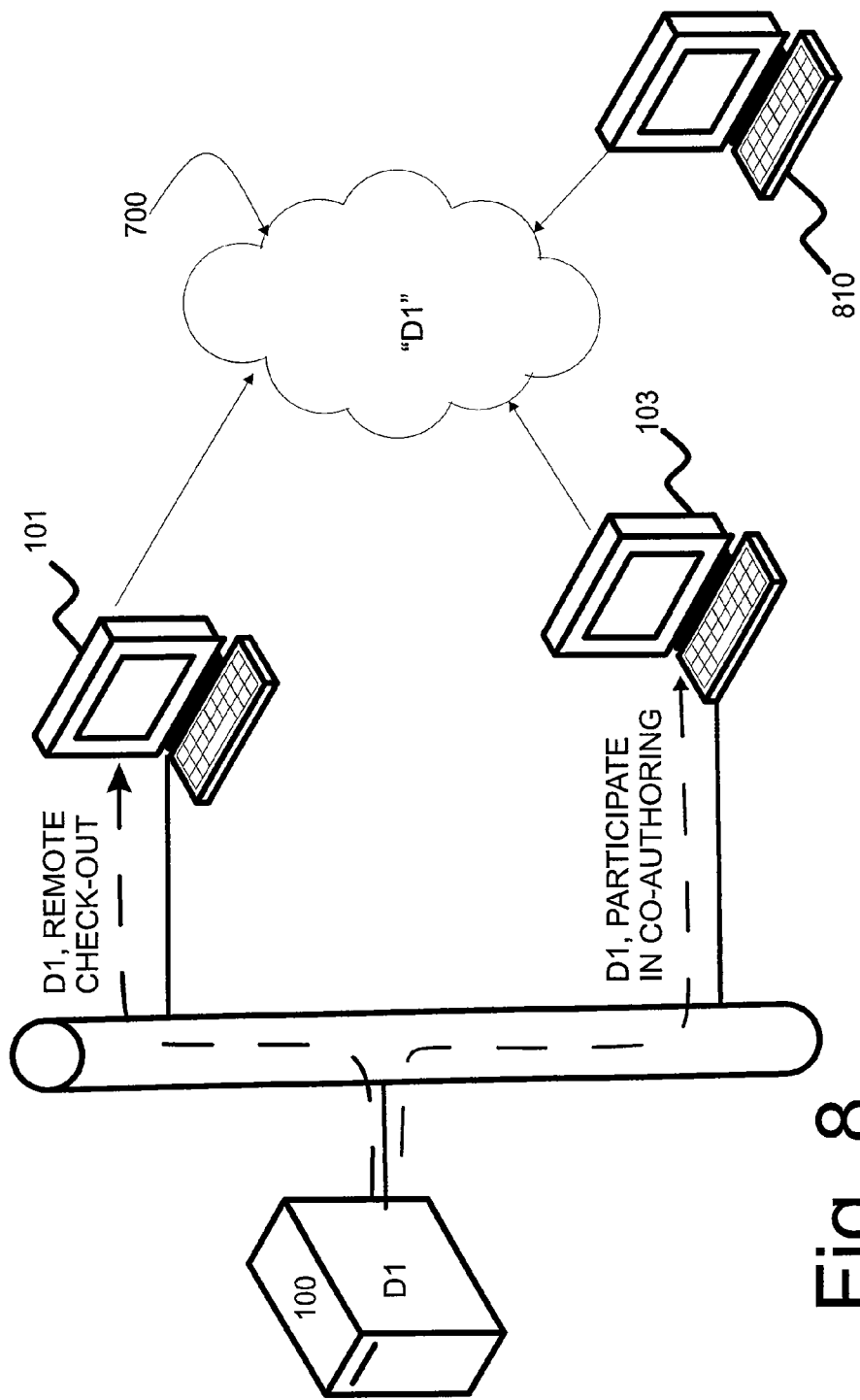
FIG. 8 shows a simplified example of a document management system where a document has been remotely checked out by client devices and by a non-client device.

Yet another example is shown in FIG. 8, which is based on the example of FIG. 7. In addition to client devices 101, 103, also at least one external device 810 can access the cloud service 700 to work with the document "D1" with the client devices 101, 103. What is noteworthy is that the device 810 can be any computing device with no access to document management server 100. The accessibility of the device 810 to the document "D1" is provided only for a time the document is in the co-authoring mode in the cloud service 700. When the client device 101 or 103 checks in the document from the remote check-out mode, the document is restored on the server, and the device 810 no longer has access to that document.

At the time the document D1 is copied to the cloud service 700, the document management system is configured to send an invitation to one or more selected external users (i.e. users of device 810) to participate in the co-authoring. Such an invitation can be formed by a user of at least one of the client devices 101, 103 or by the server. The invitation may comprise a link to the document "D1" and any authentication means, e.g., an authentication key contained in the link, by means of which the link can be directly used to access the document in the co-authoring folder. Instead of the authentication key contained in the link, the user of the device 810 may be required to input a user name and/or a password defined by the document management system.

The invitation can be as follows (please note that the link points to a cloud service, and "M-Files" is the name of the on-premise document management system):

Subject:
Agenda—Project Meeting Apil 2012
Message:
I've shared a file with you for co-authoring. To view it, click the link below.
Agenda—Project Meeting 4/2012.docx
https://cloudserver.domain.com/
redir?resid=8B7960A336C3E603!526&authkey=!AJqngBnSJ6vvz74
You can edit the file simultaneously with me and other users.
Each time you save, the file is refreshed, and you can see the changes made by others.
Shared from M-Files The various embodiments of the invention can be implemented with the help of computer program code that resides in a memory and causes the relevant apparatuses to carry out the invention. For example, a client device may comprise circuitry and electronics for handling, receiving and transmitting data, computer program code in a memory, and a processor that, when running the computer program code, causes the client device to carry out the features of an embodiment. Yet further, a server device may comprise circuitry and electronics for handling, receiving and transmitting data, computer program code in a memory, and a processor that, when running the computer program code, causes the server device to carry out the features of an embodiment.

It is obvious that the present invention is not limited solely to the above-presented embodiments, but it can be modified within the scope of the appended claims.

The invention claimed is:

1. A method for co-authoring an electronic object by at least two devices, said electronic object being stored in a document management system, the method comprising:
performing a reservation of an electronic object from a server for co-authoring as a response to a reservation request from a first client device desiring to edit said electronic object;
writing the electronic object in modifiable form to a co-authoring folder in a cloud service which is a common location accessible by the first client device and at least one other device, said at least one other device not having a client access to the document managements system;
providing an access to said first client device to said electronic object in said co-authoring folder;
sending a link to said at least one other device, said link being configured to provide an access to said at least one other device to said electronic object in Said co-authoring folder;
receiving a co-authoring request from said at least one other device using said link and providing the access to said at least one other device to said electronic object; and
reading the electronic object from the co-authoring folder and writing the electronic object to the server, when co-authoring of the electronic object is finished by said devices.

2. The method according to claim 1, further comprising:
removing the electronic object from the co-authoring folder when the co-authoring is finished.

3. The method according to claim 1, wherein the electronic object being written to the co-authoring folder comprises at least one of the following: a file, part of the metadata of the electronic object, and all metadata of the electronic object.

4. The method according to claim 1, wherein the server is an on-premise server.

5. A server for storing electronic objects in a document management system, wherein the server is configured to allow co-authoring of an electronic object by at least two devices, said server comprising a processor, and a memory including computer program code, the memory and the computer program code configured to, with the processor, cause the server to perform at least the following:
performing a reservation of an electronic object for co-authoring as a response to a reservation request from a first client device desiring to edit said electronic object;
writing the electronic object in modifiable form to a co-authoring folder in a cloud service which is a common location accessible by the first client device and at least one other device, said at least one other device not having a client access to the document management system;
providing an access to said first client device to said electronic object in said co-authoring folder;
sending a link to said at least one other device, said link being configured to provide an access to said at least one other device to said electronic object in said co-authoring folder;
receiving a co-authoring request from said at least one other device using said link;
providing the access to said at least one other device to said electronic object; and
reading the electronic object from the co-authoring folder and writing the electronic object to the server, when co-authoring of the electronic object is finished by said devices.

6. The document management system according to claim 5, wherein the server is an on-premise server.

7. A computer program product for co-authoring an electronic object, said electronic object being stored in a document management system, said computer program product comprising a non-transitory computer-readable medium bearing computer program code embodied therein for use with a computer, the computer program code comprising:
code for performing a reservation of an electronic object from a server for co-authoring as a response to a reservation request from a first client device desiring to edit said electronic object;
code for writing the electronic object in modifiable form to a co-authoring folder in a cloud service which is a common location accessible by the first client device and at least one other device, said at least one other device not having a client access to the document management system;
code for providing an access to said first client device to said electronic object in said co-authoring folder;
code for sending a link to said at least one other device, said link being configured to provide an access to said at least one other device to said electronic object in said co-authoring folder;
code for receiving a co-authoring request from said at least one other device using said link; and
code for providing the access to said at least one other device to said electronic object; and
code for reading the electronic object from the co-authoring folder and writing the electronic object to the server, when co-authoring of the electronic object is finished by said devices.

8. A document management system comprising at least one server and at least a first client device, said at least one server being configured to store an electronic object, and said system being configured to allow co-authoring of an electronic object by at least two devices, wherein
the server is configured to perform a reservation of an electronic object for co-authoring as a response to a reservation request from a first client device desiring to edit said electronic object;
the system is configured to write the electronic object in modifiable form to a co-authoring folder in a cloud service which is a common location accessible by the first client device and at least one other device, said at least one other device not having a client access to the document management system;
the system is configured to provide an access to said first client device to said electronic object in said co-authoring folder;
the system is configured to send a link to said at least one other device, said link being configured to provide an access to said at least one other device to said electronic object in said co-authoring folder;
the server is configured to receive a co-authoring request from said at least one other device using said link and;
the server is configured to provide the access to said at least one other device to said electronic object; and
the server is configured to read the electronic object from the co-authoring folder and to write the electronic object to the server, when co-authoring of the electronic object is finished by said devices.

9. The document management system according to claim 8, wherein the server is an on-premise server.

* * * * *